US 12,502,866 B2

(12) United States Patent
Clement et al.

(10) Patent No.: US 12,502,866 B2
(45) Date of Patent: Dec. 23, 2025

(54) DECORATIVE MINERAL PANEL

(71) Applicant: FLOORING INDUSTRIES LIMITED, SARL, Bertrange (LU)

(72) Inventors: Benjamin Clement, Waregem (BE); Sam Ledegen, Ghent (BE); Marijn Seynaeve, Moen (BE)

(73) Assignee: UNILIN, BV, Wielsbeke (BE)

( * ) Notice: Subject to any disclaimer, the term of this patent is extended or adjusted under 35 U.S.C. 154(b) by 130 days.

(21) Appl. No.: 18/025,318

(22) PCT Filed: Sep. 6, 2021

(86) PCT No.: PCT/IB2021/058099
§ 371 (c)(1),
(2) Date: Mar. 8, 2023

(87) PCT Pub. No.: WO2022/058836
PCT Pub. Date: Mar. 24, 2022

(65) Prior Publication Data
US 2024/0009956 A1 Jan. 11, 2024

Related U.S. Application Data

(60) Provisional application No. 63/078,481, filed on Sep. 15, 2020.

(51) Int. Cl.
B32B 3/30 (2006.01)
B32B 13/02 (2006.01)
B32B 13/14 (2006.01)
B44C 5/04 (2006.01)

(52) U.S. Cl.
CPC ............... *B32B 3/30* (2013.01); *B32B 13/02* (2013.01); *B32B 13/14* (2013.01); *B44C 5/0453* (2013.01); *B32B 2307/4026* (2013.01); *B32B 2419/00* (2013.01); *B32B 2451/00* (2013.01); *Y10T 428/24612* (2015.01)

(58) Field of Classification Search
CPC ........... B32B 3/30; B32B 13/02; B32B 13/14; B32B 2307/4026; B32B 2419/00; B32B 2451/00; B44C 5/0453; Y10T 428/24612
See application file for complete search history.

(56) References Cited

U.S. PATENT DOCUMENTS

| 4,420,525 | A | 12/1983 | Parks | |
|---|---|---|---|---|
| 2010/0326326 | A1* | 12/2010 | Rigaud | C04B 28/04 428/401 |
| 2020/0284049 | A1* | 9/2020 | De Rick | B32B 9/02 |

FOREIGN PATENT DOCUMENTS

| CN | 106116690 A | | 11/2016 | |
|---|---|---|---|---|
| CN | 107698223 A | * | 2/2018 | |
| DE | 102013101521 A1 | * | 8/2014 | B44C 5/04 |
| WO | 0166877 A1 | | 9/2001 | |

(Continued)

OTHER PUBLICATIONS

[NPL-1] Schubert (DE 102013101521 A1); Aug. 21, 2014 (EPO machine translation to English). (Year: 2014).*

(Continued)

*Primary Examiner* — Donald M Flores, Jr.
(74) *Attorney, Agent, or Firm* — Workman Nydegger

(57) ABSTRACT

A decorative panel includes a mineral layer, and a decorative surface. The decorative surface has an embossed pattern, wherein the embossed pattern is provided in the mineral layer.

19 Claims, 5 Drawing Sheets

(56) References Cited

FOREIGN PATENT DOCUMENTS

| WO | 0196689 A1 | 12/2001 | |
|---|---|---|---|
| WO | WO-2008136596 A1 * | 11/2008 | ......... B28B 23/0006 |
| WO | WO-2013186530 A1 * | 12/2013 | ............... G01N 1/30 |
| WO | 2018002859 A1 | 1/2018 | |
| WO | WO-2018015614 A1 * | 1/2018 | ............... B28B 1/44 |

OTHER PUBLICATIONS

[NPL-2] Xu (CN 107698223 A); Feb. 16, 2018 (European Patent Office machine translation to English). (Year: 2018).*
International Search Report from PCT Application No. PCT/IB2021/058099, Dec. 10, 2021.

* cited by examiner

DECORATIVE MINERAL PANEL

TECHNICAL FIELD

The invention relates to field of decorative panels wherein the decor is provided in or on a mineral layer. A preferred application of the invention relates to decorative mineral panels that show a wood imitation or a natural stone imitation as decoration. The panels of the invention can be used as floor panels, as wall panels or as ceiling panels. The invention further relates to methods of manufacturing such panels, as well as to a method to make a mold that can be used in the methods of manufacturing such panels.

BACKGROUND ART

There is a need for panels that provide a close imitation of wood or stone. A realistic imitation requires a texture in the surface of the panel as well as a staining in register with the texture. The texture of wood or stone comprises in most cases (especially for wood) undercuts. A realistic imitation is especially challenging for outdoor applications, e.g. for outdoor floor panels, because of the specific durability requirements for outdoor applications of panels.

WO01/96689A1 discloses a floor covering consisting of hard panels with a laminated structure. In particular, an MDF (Medium Density Fiber board) or an HDF (High Density Fiber board) is used as base layer for the panel. The upper surface of the panel has a printed decorative layer presenting a wood pattern. A transparent layer of synthetic material is provided on the printed decorated layer. Impressions are formed in this transparent layer. The impressions substantially follow the wood pattern. This way, floor panels with very realistic wood imitation are obtained. Such approach is however not possible on panels wherein the decor layer is provided in a concrete layer.

Some techniques have been described for creating a decorative surface on a concrete panel using a mold having a printed pattern of concrete surface setting retarder.

CN106116690A discloses a printed film for making a concrete veneer through set-retarding and eroding. The printed film comprises a base film and a set-retarder print. The set-retarder coating is fixed onto the surface of the base film. The printed film is laid at the bottom of a mold and concrete is poured in the mold. After the casted concrete product has been demolded, washing is performed with water for erosion to obtain the designed pattern. A decoration surface of convex-concave pattern veneers can be formed on the concrete surface.

DISCLOSURE OF THE INVENTION

The objective of the invention is to provide decorative panels having a mineral layer as top layer. It is an objective of the invention to provide such panels with very realistic decorative face imitating natural materials such as wood or stone. It is an objective of embodiments of the invention to provide such panels that are durable, even for outdoor use.

The first aspect of the invention is a decorative panel comprising a mineral layer. The decorative panel comprises a decorative surface. The decorative surface comprises an embossed pattern. The embossed pattern is provided in the mineral layer.

The decorative panels of the first aspect of the invention allow to provide panels that simulate the texture of wood panels or of natural stone.

Preferably, the embossed pattern comprises undercuts in the surface of the panel. Such panels provide an even more realistic image of a natural texture, e.g. of wood or of natural stone. With respect to wood, the undercuts allow to represent the nerves of wood.

More preferably, the embossed pattern comprises undercuts with an undercut of more than 0.5 millimeter, preferably with an undercut of more than 1 millimeter, preferably with an undercut of more than 2 millimeter. Such panels provide an even more realistic image of a natural texture, e.g. of wood or of natural stone. With respect to wood, the undercuts allow to represent the nerves of wood.

Preferably, the mineral layer has a density between 1100 and 2400 $kg/m^3$; preferably the mineral layer has a density higher than 1600 $kg/m^3$, more preferably the density of the mineral layer is between 2300 and 2400 $kg/m^3$.

Preferably, the mineral layer is less than 16 mm thick, more preferably the mineral layer is less than 14 mm, and even more preferably the mineral layer is less than 12 mm thick.

Preferably, the mineral layer comprises pigments, wherein the pigments color the mineral layer throughout its entire volume. Such embodiments have the benefit that a damage to the surface of the decorative panel, e.g. during the use of the panel, is less noticed. Especially when the surface of the decorative panel is stained or colored in the same color as the body of the mineral layer, e.g. because no coloring has been applied to the surface of the mineral layer. More preferably, the pigments comprise pigments of different colors (e.g. three or more selected from red, yellow, black, white, and blue), in defined ratios, for determining the color throughout the volume of the mineral layer. More preferably, the pigments are inorganic pigments. Inorganic pigments allow to have excellent compatibility with the mineral layer composition and its production process.

Preferably, the decorative panel is rectangular, whether square or oblong. At least two opposite edges of the decorative panel, and preferably all four edges, are provided with a bevel. More preferably, the bevel(s) are provided in the mineral layer.

Preferably, the mineral layer comprises one or a plurality of reinforcement layer(s), e.g. glass fiber scrims or glass fiber meshes. The glass fiber scrims or glass fiber meshes can be woven or nonwoven. More preferably, at least a glass fiber scrim or a glass fiber mesh is provided at the back side of the mineral layer or within the mineral layer. Such embodiments provide increased strength to the mineral layers and to the decorative panels.

Preferably, the mineral layer comprises fibers, such as glass fibers (preferably chopped glass fibers), basalt fibers or polymeric fibers, such as acrylic fibers, PVA (polyvinyl alcohol)—fibers, polypropylene fibers, polyacrylonitrile fibers, polyethylene fibers, polyamide fibers or polyimide fibers; or mixtures of these fibers. This way, stronger mineral layers and stronger decorative panels can be obtained.

A preferred decorative panel is rectangular, square or oblong. The length over width ratio of the decorative panel is preferably between 1/1 and 4/1; or the length over width ratio of the panel is preferably between 6/1 and 14/1. It is an advantage of such embodiments that wood panel imitations can be provided that have the same length over width ratio as existing wood panels. Such embodiments are of particular interest for use in floor coverings.

More preferably, the length of the panel is more than 1200 mm, preferably between 1200 and 3000 mm. It is an advantage of such embodiments that wood panel imitations can be provided that have the same length as existing wood panels. Such embodiments are of particular interest for use in floor, wall and ceiling coverings.

Preferably, the embossed pattern comprises elongated recesses, wherein the depth of the elongated recesses is larger than their width. It is a benefit of such embodiments that a realistic imitation of the texture of wood can be provided.

In preferred embodiments of the first aspect of the invention, the surface of the decorative panel imitates a wood panel or a stone tile. When the surface of the decorative panel imitates a wood panel, the embossed structure preferably imitates wood nerves and/or wood pores.

The mineral layer of a preferred decorative panel is provided with a staining pattern, wherein the staining pattern is provided in register with the embossed pattern. Such embodiments allow to provide a realistic imitation of wood or of natural stone.

The staining in register can be obtained by applying a liquid staining. Where the porosity of the embossed surface of the mineral layer is higher, more staining liquid is drawn into the pores, resulting in a more pronounced staining at the higher porosity regions, creating the staining in register.

Preferably, the staining pattern comprises nanopigments in a binder. More preferably the nanopigments are smaller than 10 micrometer, more preferably smaller than 1 micrometer. Such embodiments allow to provide an excellent staining quality, while providing good mechanical properties of the surface of the mineral layer, e.g. scratch resistance. Furthermore, the staining can be efficiently and effectively provided as a thin layer on the mineral layer.

The mineral layer of a preferred embodiment comprises pigments. The pigments color the mineral layer throughout its entire volume in a color that does not contrast with the staining of the embossed surface, preferably such that small damages to the surface of the panel are less visible. It is a benefit that less staining needs to be applied to reach the desired staining.

The decorative panel of a preferred embodiment is rectangular, whether square or oblong, and wherein at least two opposite edges of the decorative panel, and preferably all four edges, are provided with a bevel. The bevels are stained in accordance with the staining pattern of the mineral layer, preferably wherein the bevel(s) are provided in the mineral layer. As the bevels are stained in accordance with the staining pattern of the mineral layer, a very realistic imitation of a wood panel or a natural stone provided with bevels can be realized.

Preferably, the mineral layer is provided with a sealing agent before and/or after application of the staining, more preferably the sealing agent comprises one or more of a polymer based sealing agent (e.g. ethylene vinyl acetate or polyurethane), a silicone or a silicate based sealing agent. Water absorption and water penetration in the mineral layer is prevented by the sealing agent. Such embodiments are particularly interesting when the material of the mineral layer is prone to water absorption or water penetration. The application of a sealing agent is of particular interest when the mineral layer is a magnesium oxide panel and/or comprises a magnesium oxide binder.

The decorative surface of a preferred decorative panel comprises one or a plurality of lacquer layers. The presence of lacquer layers provides improved durability of the decorative panel, e.g. increased resistance against mechanical action, e.g. increased scratch resistance.

Preferably, the lacquer layer(s) comprise(s)—and more preferably consist(s) of—acrylates, preferably aliphatic urethane acrylates, more preferably UV-cured or EB (excimer beam)-cured. This way, a very flexible but at the same time a very durable lacquer layer is provided on the decorative panel.

Aliphatic urethane acrylates are preferred because of the flexible film provided by these products once cured relevant for the durability of the panel; and their resistance to the range of outdoor temperatures when the decorative panels are used outdoor, e.g. as floor panel or as wall panel.

Preferably, at least one of the one or a plurality of lacquer layers comprise additives, such as biocides, abrasion resistant particles such as aluminum oxide particles, or anti-slip additive. Such embodiments provide increased durability of the surface of the decorative panels.

Preferably, the total surface weight of the one or the plurality of lacquer layers is less than 300 gram per square meter of the surface of the decorative panel, more preferably less than 200 gram per square meter of the surface of the decorative panel. Such embodiments allow to achieve excellent surface properties of the decorative panels while limiting the thickness of the lacquer layers.

Preferably, the lacquer layers do not comprise matting agents. Such embodiments have the benefit that the durability of the surface of the decorative panel is improved. It is believed that this benefit is achieved thanks to limitation of the amount of additives in the lacquer layer(s).

It is possible to obtain a matt decorative surface of the decorative panel by using excimer curing of the lacquer layer(s), even without using matting agent in the lacquer layers. Excimer curing can provide a physical matting.

Preferably, the body of the mineral layer comprises abrasion resistant particles, such as aluminum oxide particles, corundum particles or granite particles. Such approach is particularly interesting when the mineral layer is a magnesium oxide layer, and when the mineral layer does not comprise coating layers, with the possible exception of a sealing agent applied on the mineral layer. The decorative panels of such embodiments can be produced in an easier way, as no coating layers—with the possible exception of a sealing agent applied on the mineral layer—need to be applied on the mineral layer, while a highly durable surface (including high scratch resistance) of the decorative layer is obtained.

The mineral layer of preferred decorative panels does not comprise coating layers, with the possible exception of a sealing agent applied on the mineral layer. It is a benefit of such embodiments that the mineral layer itself provides the color and the wear resistance to the surface of the decorative panel.

The optional sealing agent is of particular interest when the mineral layer is a magnesium oxide layer. The sealing agent will prevent leaching of magnesium sulfate and/or magnesium oxychloride; and will prevent that water penetrates in the mineral layer. Consequently, such decorative panels are more durable. The optional sealing agent can comprise one or more of a polymer-based sealing agent (e.g. ethylene vinyl acetate or polyurethane), a silicone, or a silicate based sealing agent.

A preferred decorative panel comprises a multilayer structure, wherein the mineral layer is bonded onto a carrier layer. Such embodiments allow to provide improved properties to the decorative panel. It allows e.g. to reduce its weight, and to provide coupling parts in the carrier layer in an efficient and effective manner.

Preferably, the carrier layer is selected from one or more of a concrete panel, a fiber cement panel, a magnesia based panel, a fiber cement based panel, a gypsum based panel, a MDF (Medium Density Fiberboard)—panel, a HDF (High Density Fiberboard)—panel, a synthetic based panel, an OSB-panel, a ceramic panel, a quartz panel, a porcelain panel or a wood chip board.

Examples of magnesia based panels that can be used as carrier layer is a magnesium oxide panel. Preferred magnesia based panels—e.g. magnesium oxide panels—preferably comprise fillers.

Examples of gypsum based panels that can be used as carrier layer comprise fibers and/or filling particles.

Examples of synthetic based panels that can be used as carrier layer are panels that comprise a thermoplastic matrix, e.g. polyvinyl chloride (PVC). Examples of such panels that can be used as carriers are rigid polyvinyl chloride panels, luxury vinyl panels (LVT), stone plastic composites (SPC) or wood plastic composites (WPC). Such preferred carrier layers comprising a thermoplastic matrix preferably comprise fillers.

Preferably, the carrier layer is provided with a structured surface at the interface with the mineral layer. This way, improved adhesion between carrier layer and the mineral layer is obtained.

Preferably, the mineral layer is bonded to the carrier layer by means of an adhesive or by means of cementitious or inorganic binders present in the mineral layer. This way, excellent adhesion between carrier layer and the mineral layer is obtained.

Preferably, the carrier layer is a second mineral layer, wherein the second mineral layer differs in composition from the mineral layer. The second mineral layer can comprise on average coarser aggregates than the mineral layer; and/or the second mineral layer does not comprise inorganic pigments whereas the mineral does comprise inorganic pigments such that the second mineral layer has its natural color (e.g. the color of concrete when the second mineral layer is a concrete layer). Such embodiments allow to optimize properties of the decorative panel while reducing its cost. It is possible to provide the carrier layer out of cheaper raw material than the mineral layer.

Preferably, the mineral layer is selected from a concrete layer, a magnesium oxide layer, or a gypsum layer.

Preferably, the mineral layer comprises anyone of or a combination of one or more selected from Portland cement, Sorel cement, magnesium oxychloride cement, magnesium oxysulphate cement, gypsum or a geopolymer cement binder.

Preferably, the mineral layer is a concrete layer comprising ultra high performance concrete (UHPC). UHPC concrete (also known as reactive powder concrete—RPC) is characterized by a higher relative amount of Portland cement than standard concrete and by using finer aggregates than in standard concrete. It is a particular benefit of mineral layers comprising UHPC concrete that a decorative panel is obtained that is extremely durable, even for outdoor use. Such decorative panels are have also excellent good water resistance. It is also a benefit of the use of UHPC that thin panels can be made with an excellent surface definition.

UHPC premixes are available on the market, that can be used by just adding water, or adding extra additives besides adding water. Examples of ultra high performance concrete (UHPC) that can be used in the invention are e.g. provided in US2010/0326326A1.

In a preferred decorative panel, the mineral layer comprises or consists of a magnesium oxide panel. The magnesium oxide panel optionally comprises one or more fillers selected from the list of mineral fillers (e.g. calcium carbonate, kaolin, fly ash, or fumed silica), cellulose based materials (e.g. wood fibers, or wood flakes), reinforcement fibers (e.g. glass fibers, basalt fibers, polyvinyl alcohol fibers) or reinforcement meshes (e.g. woven glass fiber cloths or nonwoven glass fiber meshes or cloths) or light weight fillers such as perlite, expanded polystyrene or expanded polypropylene.

A preferred decorative panel comprises a first pair of parallel opposite edges, wherein the first pair of parallel opposite edges comprises coupling parts, which allow that two of such floor panels mutually can be coupled to each other at the parallel opposite edges. Such embodiments facilitate the installation of the decorative panels.

Optionally, the surface of the coupling parts is at least partly provided with a sealing agent. The presence of a sealing agent has the benefit that water penetration in the panel is prevented. When the decorative panel comprises a mineral layer comprising or consisting of magnesium oxide, the sealing agent has the further benefit of preventing leaching of magnesium oxide or magnesium sulphate which would be negative over time for the properties of the decorative panel. The optional sealing agent can e.g. comprise or consist of one or more of a polymer-based sealing agent (e.g. ethylene vinyl acetate or polyurethane), a silicone, or a silicate based sealing agent.

Optionally, the coupling parts comprise locking elements which prevent the drifting apart of two coupled panels into the direction perpendicular to the surface of the coupled panels and/or into the direction perpendicular to the respective coupled edges in the plane of the coupled panels. Such embodiments further facilitate the installation of the panels and allow a floating installation of a covering, e.g. a floor covering, with the decorative panels.

Preferably, the decorative panel comprises a second pair of opposite edges. The second pair of opposite edges comprises coupling parts which allow that two of such floor panels mutually can be coupled to each other. Such embodiments improve the facility of installation of the decorative panels even further. The second pair of opposite edges is preferably perpendicular to the first pair of opposite edges.

Optionally, the surface of the coupling parts of the second pair of opposite edges is provided with a sealing agent. The presence of a sealing agent has the benefit that water penetration in the panel is prevented. When the decorative panel comprises a mineral layer comprising or consisting of magnesium oxide, the sealing agent has the further benefit of preventing leaching of magnesium oxide or magnesium sulphate which would be negative over time for the properties of the decorative panel. The optional sealing agent can e.g. comprise or consist of one or more of a polymer-based sealing agent (e.g. ethylene vinyl acetate or polyurethane), a silicone, or a silicate based sealing agent.

Optionally, the coupling parts at the second pair of opposite edges comprise locking elements which prevent the drifting apart of two coupled panels into the direction perpendicular to the surface of the coupled panels and/or into the direction perpendicular to the respective coupled edges in the plane of the coupled panels. Such embodiments further facilitate the installation of the panels and allow a floating installation of a covering, e.g. a floor covering, with the decorative panels.

Preferably, the coupling parts are at least partially provided in the mineral layer. The coupling parts can be provided at least partially in the mineral layer during the casting process in which the mineral layer is produced, and/or by means of machining operations such as grinding.

In embodiments wherein the decorative panel comprises a multilayer structure, wherein the mineral layer is bonded onto a carrier layer, the coupling parts are provided at least partially in the carrier layer, and preferably entirely in the carrier layer, preferably by means of milling. Such embodiments offer the benefit that the coupling parts can be provided in a carrier layer that is well suited for accommodating the coupling parts, while the top layer of the decorative panel is provided by the mineral layer.

In a preferred embodiment, the decorative panel comprises a first pair of parallel opposite edges. The mineral layer comprises at the first edge of the first pair of parallel opposite edges a first contact surface. The mineral layer comprises at the second edge of the first pair of parallel opposite edges a second contact surface. In parallel coupled condition of two such panels, a first such panel and a second such panel, at the first pair of parallel opposite edges the first contact surface of a first panel contacts the second contact surface of the second panel. Such embodiments allow to simulate in an efficient way wood panels that contact each other.

In preferred embodiments, the first contact surface and the second contact surface are parallel with the surface of the decorative panel.

In preferred embodiments, the first and second contact surfaces are perpendicular to the surface of the decorative panel.

In a preferred embodiment, the decorative panel comprises a first pair of parallel opposite edges, wherein the first pair of parallel opposite edges is configured such that two such decorative panels can be coupled at their respective edges of the first pair of parallel opposite edges with an overlap of the mineral layers of the two decorative panels.

In a preferred embodiment, the decorative panel comprises a first pair or parallel opposite edges, wherein both edges of the first pair of parallel opposite edges are each provided with a recess for fitting an insert such that the first edge of the first pair of parallel opposite edges of a first such panel can be coupled to the second edge of the first pair of parallel opposite edges of a second such panel by insertion of an insert in their respective recesses, preferably such that the insert presses the first such panel towards the second such panel by means of an elastic force of the insert. More preferably, the recesses are provided at the bottom of the decorative panel. Inserts can be used e.g. as described in WO01/66877A1 or in WO2018/002859A1.

Preferably, the decorative panel is a floor panel, a wall panel or a ceiling panel.

A second aspect of the invention is a floor covering. The floor covering comprises a plurality of decorative panels as in any embodiment of the first aspect of the invention. The decorative panels are bonded onto the floor by means of an adhesive, preferably by means of mortar.

A third aspect of the invention is a floor covering. The decorative panels of this floor covering are free floating. Such embodiments provide an easy way of installation.

In a preferred floor covering according to the second aspect of the invention or according to the third aspect of the invention, in top view of the floor covering, only the mineral layer of the decorative panels, with its embossments and with its optional lacquer layer(s), is visible. Such embodiments allow to provide an excellent imitation of a wood panel floor covering or of a natural stone tile floor covering.

In a preferred floor covering according to the second aspect or according to the third aspect, a grouting material and/or an adhesive is provided between neighboring decorative panels. Such embodiments have the benefit that a better bonding is obtained between the decorative panels. Furthermore, the grouting material and/or adhesive can provide improved water tightness. When the grouting material and/or adhesive is visible in the floor covering, it can assist in providing a realistic imitation of a floor covering comprising natural stone tiles, as such covering of natural stone tile normally is provided with grout at the edges of the natural stone tiles.

In a preferred floor covering according to the second aspect or according to the third aspect, the decorative panels comprise a first pair or parallel opposite edges, wherein both edges of the first pair of parallel opposite edges are each provided with a recess for fitting an insert. An insert is fitted in the recesses of the first edge of the first pair of parallel opposite edges of a first such panel and in the second edge of the first pair of parallel opposite edges of a second such panel in order to couple the first such panel to the second such panel. Preferably, the insert presses the first such panel towards the second such panel by means of an elastic force of the insert. Preferably, the recesses are provided at the bottom of the decorative panel.

A fourth aspect of the invention is a method to produce a decorative panel, optionally a decorative panel as in any embodiment of the first aspect of the invention. A mold—preferably comprising or consisting of elastomeric material—is provided comprising the negative of the embossed pattern of the surface of the decorative panel to be manufactured. Optionally, a release agent is sprayed in the mold. A slurry, comprising an inorganic binder is poured in the mold to create a mineral layer for the decorative panel, wherein the surface of the mineral layer is to comprise the embossed pattern. The cast panel is demolded after the slurry has dried and set. Such method allows to produce decorative panels having a mineral layer that has a surface texture that imitates wood or natural stone.

Preferably, the mold comprises or consists of elastomeric material. The elastomeric material is preferably selected from silicone, thermoplastic elastomer (TPE), or polyurethane.

In a preferred method of the fourth aspect of the invention, after pouring the slurry into the mold, a carrier layer is applied onto the slurry, in order to provide the mineral layer on a carrier layer in the decorative panel.

Preferably, the carrier layer is applied by applying a solid carrier layer, or by pouring a second slurry onto the slurry, more preferably wherein the second slurry has a different composition than the slurry. Such methods allow to provide a carrier layer which is cheaper that the mineral layer and which has characteristics to optimize the properties of the body of the decorative panel.

In a preferred embodiment of the fourth aspect of the invention, the embossed pattern provided on the surface of the mineral layer comprises undercuts, preferably comprising undercuts with undercut of more than 0.5 millimeter, more preferably comprising undercuts with an undercut of more than 1 millimeter, preferably with an undercut of more than 2 millimeter. Such embodiments provide a even more realistic imitation of wood or natural stone.

A fifth aspect of the invention is a method to produce a decorative panel, optionally a decorative panel as in the first aspect of the invention. A slurry comprising an inorganic binder is extruded or cast on a flat mold or on a flat carrier to produce a mineral layer for the decorative panel. In a subsequent process step the mineral layer is embossed by means of a structured press plate or by means of an embossing cylinder, preferably wherein the embossing is performed without a décor paper having been applied on the mineral layer, and preferably also without coating layers having been applied on the mineral layer. Preferably a mineral layer with thickness between 5 and 16 millimeter is produced. The method of the fifth aspect of the invention allows to produce decorative panels having a mineral layer that has a surface texture that imitates wood or natural stone.

Preferably, the slurry is extruded on a carrier, wherein the carrier will form a carrier layer for the mineral layer of the decorative panel. More preferably, the carrier is selected from a concrete panel, a fiber cement panel, a magnesium oxide board—preferably comprising fillers—a fiber cement based panel, a gypsum based panel—preferably a gypsum panel comprising fibers and/or filling particles, a MDF-panel, a HDF-panel, a synthetic based panel—preferably a synthetic based panels comprising fillers and/or particles (e.g. thermoplastic matrix e.g. PVC, preferably comprising fillers; e.g. LVT, SPC, WPC . . . ), an OSB-panel, a ceramic panel, a quartz panel, a porcelain panel or a wood chip board.

In a preferred method according to the fifth aspect of the invention, the mineral layer is allowed to dry and cure after embossment of the mineral layer by means of the structured press plate or by means of the embossing cylinder.

In a preferred method according to the fifth aspect of the invention, the mineral layer is allowed to partly dry and set at elevated temperatures before the step of embossing the mineral layer by means of the structured press plate or by means of the embossing cylinder; and subsequently the mineral layer is allowed to cure fully at elevated temperatures.

In a preferred method according to the fourth aspect of the invention or according to the fifth aspect of the invention, the slurry is selected from a concrete—preferably an ultra high performance concrete-, an MgO (magnesium oxide) slurry, a gypsum slurry, or a slurry comprising a geopolymer cement binder.

In a preferred method according to the fourth aspect of the invention or according to the fifth aspect of the invention, the inorganic binder in the slurry comprises anyone of or a combination of one or more selected from Portland cement, Sorel cement, magnesium oxychloride cement, magnesium oxysulphate cement, gypsum or a geopolymer cement binder.

In a preferred embodiment wherein the slurry comprises one or more of Sorel cement, magnesium oxychloride cement, or magnesium oxysulphate cement, the amount of active lime in the slurry is less than 2.5 percent by weight. With active lime is meant calcium oxide, calcium hydroxide and certain types of calcium silicates.

In a preferred method according to the fourth aspect of the invention or according to the fifth aspect of the invention, the slurry comprises pigments.

In a preferred method according to the fourth aspect of the invention or according to the fifth aspect of the invention, the slurry comprises abrasion resistant particles, such as aluminum oxide particles, corundum particles or granite particles. Such approach is of particular interest when the mineral layer is a magnesium oxide layer.

In a preferred method according to the fourth aspect of the invention or according to the fifth aspect of the invention, the inorganic binder comprises or consists of any one or a combination of Sorel cement, magnesium oxychloride or magnesium oxysulphate cement, and the slurry comprises one or more fillers selected from the list of mineral fillers (e.g. calcium carbonate, kaolin, fly ash, fumed silica), cellulose based materials (e.g. wood fibers, wood flakes), reinforcement fibers (e.g. glass fibers, basalt fibers, polyvinyl alcohol fibers) or reinforcement meshes (e.g. woven glass fiber cloths or nonwoven glass fiber meshes or cloths), or light weight fillers such as perlite, expanded polystyrene or expanded polypropylene.

In a preferred method according to the fourth aspect of the invention or according to the fifth aspect of the invention, a staining is applied onto the embossed surface of the mineral layer, preferably by means of a roller coater or by means of spraying, or by means of digital inkjet printing. Such embodiments allow to stain the textured surface of the mineral layer simulating wood or natural stone in the same color of wood or natural stone, the staining is performed in register, and thereby providing a very realistic simulation of wood or natural stone.

Preferably, the staining is applied using pigments in a binder system. More preferably the binder is a UV-curing binder or an EB (electron beam)—curing binder. Even more preferably the binder comprises or consists of an acrylate monomer and/or oligomer binder. More preferably, the staining is at least partially cured by means of UV-radiation or by means of EB-curing.

Preferably, the viscosity of the staining being applied is less than 200 mPa·s, more preferably less than 100 mPa·s, even more preferably less than 40 mPa·s.

Preferably, one or a plurality of lacquer layers are applied on top of the staining. The lacquer layers can include a primer, a sealer and a top coat. Preferably at least one—and preferably all—of the plurality of coating layers comprise aliphatic urethane acrylates. Such embodiments allow to provide optimum properties to the surface of the decorative panel, e.g. durability.

Preferably, the one or the plurality of coating layers are applied by means of a roller coater or by means of spraying or by means of ink jet printing.

Preferably, at least one and preferably all lacquer layers are provided by applying any one or a combination of an UV-curing lacquer layer, an EB-curing lacquer layer, a water-based lacquer layer, or a solvent based lacquer layer.

Preferably at least one and preferably all lacquer layers are provided by an aliphatic urethane acrylate.

A sixth aspect of the invention is a method for manufacturing a mold for use in a method to produce a decorative panel comprising a mineral layer wherein the mineral layer comprises an embossed pattern. Optionally, the method of the sixth aspect of the invention can be used in any embodiment of the fourth aspect of the invention, and/or to manufacture a decorative panel as in any embodiment of the first aspect of the invention. The method of the sixth aspect of the invention comprises the steps of:

providing a wood panel or a stone tile, optionally sanding and brushing the surface of the wood panel or the surface of the stone tile, applying a release agent onto the surface of the wood panel or on the surface of the stone tile, pouring elastomeric polymer onto the surface of the wood panel or onto the surface of the stone tile and letting the elastomeric polymer to set and/or to cure thereby making an elastomeric polymer membrane comprising the negative image of the surface of the wood panel or the surface of the stone tile, and removing the elastomeric polymer membrane from the wood panel.

The method of the sixth aspect of the invention provides a mold that is very well suited to manufacture decorative panels that show a very realistic imitation of the surface of the wood panel or stone tile used to produce the mold.

Preferably, the elastomeric material is selected from silicone, thermoplastic elastomer (TPE), or polyurethane.

MODE(S) FOR CARRYING OUT THE INVENTION

Figure 1:
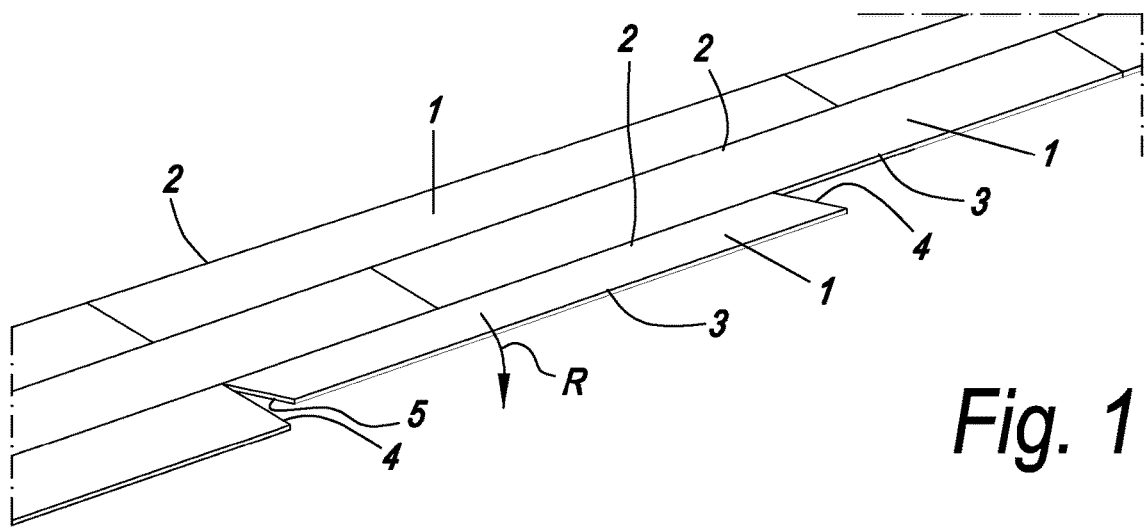
FIG. 1 schematically represents a portion of a floor covering according to aspects of the invention; and consisting of decorative panels according to aspects of the invention.
Figure 2:
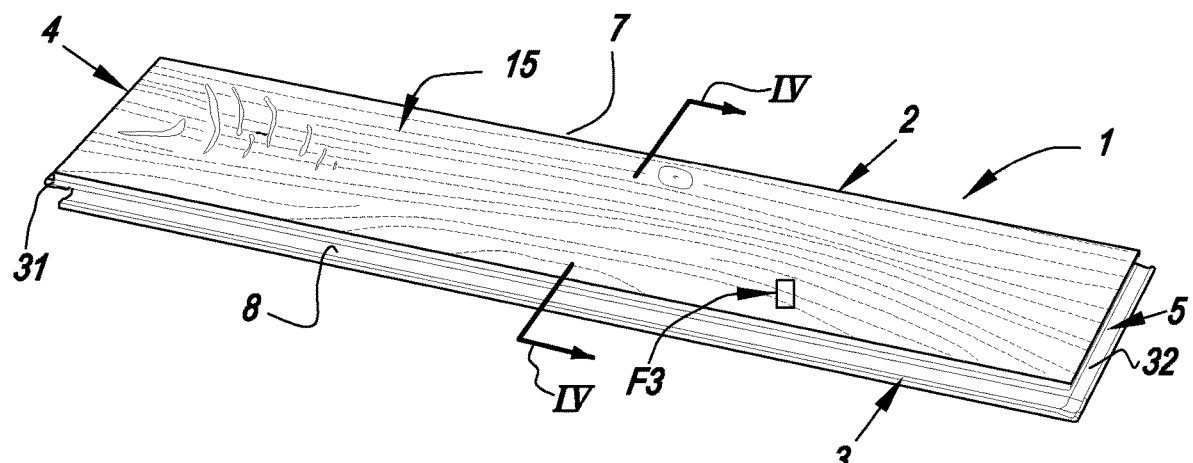
FIG. 2 shows a decorative panel according to the invention, as used in the floor covering of FIG. 1.

FIG. 1 illustrates an example of a floor covering according to aspects of the invention. The floor covering shown in FIG. 1 consists of decorative floor panels 1 according to aspects of the invention. The decorative panels 1 are rectangular and oblong. FIG. 2 shows a decorative floor panel 1 of FIG. 1 in more detail. The floor panels are only schematically shown in FIG. 1, without the details of their surface texture. The decorative floor panels of FIGS. 1 and 2 comprise a first pair of opposite edges 2, 3 and a second pair of opposite edges 4, 5.

The decorative floor panels 1 are configured at their edges such that they can be coupled according to the so-called fold-down principle, which is a principle known as such and which consists in that such floor panels 1 can be coupled to each other at the first pair of edges 2, 3 by a turning movement R and at the second pair of edges 4, 5 by a downward movement, wherein the downward movement is the result of the turning movement R and thus is effected substantially simultaneously. The floor panels 1 of the example also are configured such that at their edges 2, 3 and 4, 5 a locking is effected in the direction perpendicular to the surface of the floor covering as well as in the direction parallel to the surface of the floor covering and perpendicular to the coupled edges. The decorative floor panels 1 in FIG. 1 are free floating in the floor covering.

Figure 4:
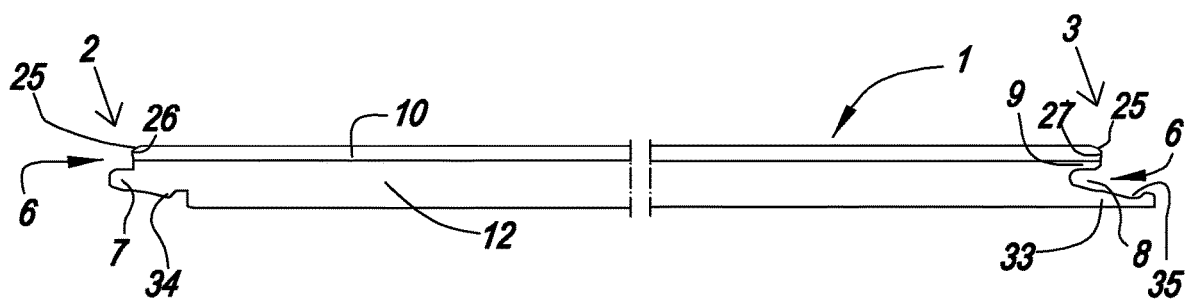
FIG. 4 shows a cross-section along line Iv-Iv shown in FIG. 2.
Figure 5:
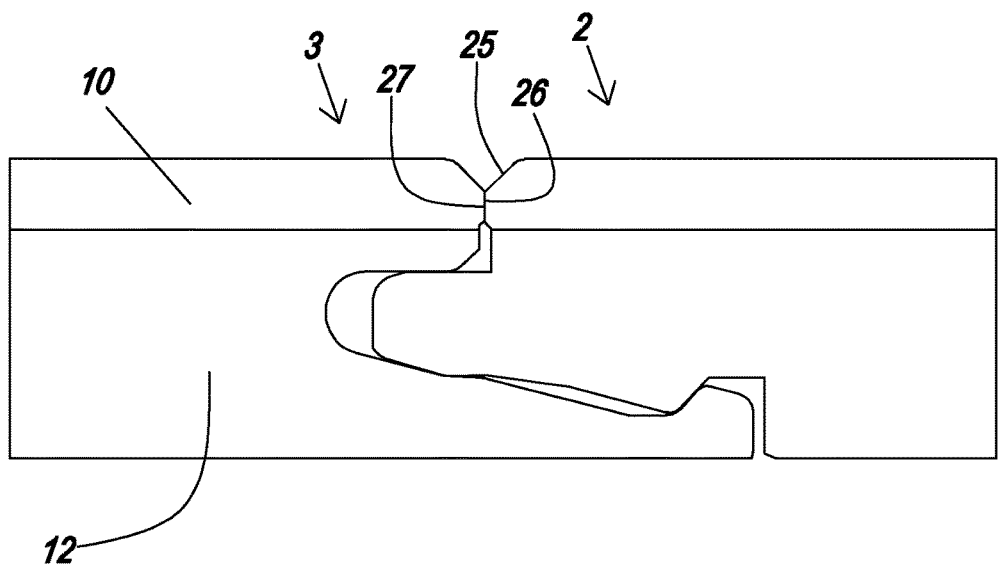
FIG. 5 shows decorative panels according to FIGS. 2, 3 and 4 coupled at their first pair of opposite edges.

FIG. 2 shows the decorative floor panels used to install the floor covering of FIG. 1. Both pairs of opposite edges 2, 3, 4, 5 are provided with mechanical coupling means 7, 8, 31, 32. Two such panels can be coupled at their first pair of opposite edges by means of a rotating movement R around the respective edges 2, 3 and/or coupling by means of a sliding movement S in a substantially horizontal manner of the edges to be coupled 2, 3 to each other. FIG. 4 shows the coupling parts at the first pair of opposite edges 2, 3. FIG. 5 shows a detail of two such panels coupled at their first pair of opposite edges 2, 3.

Figure 3:
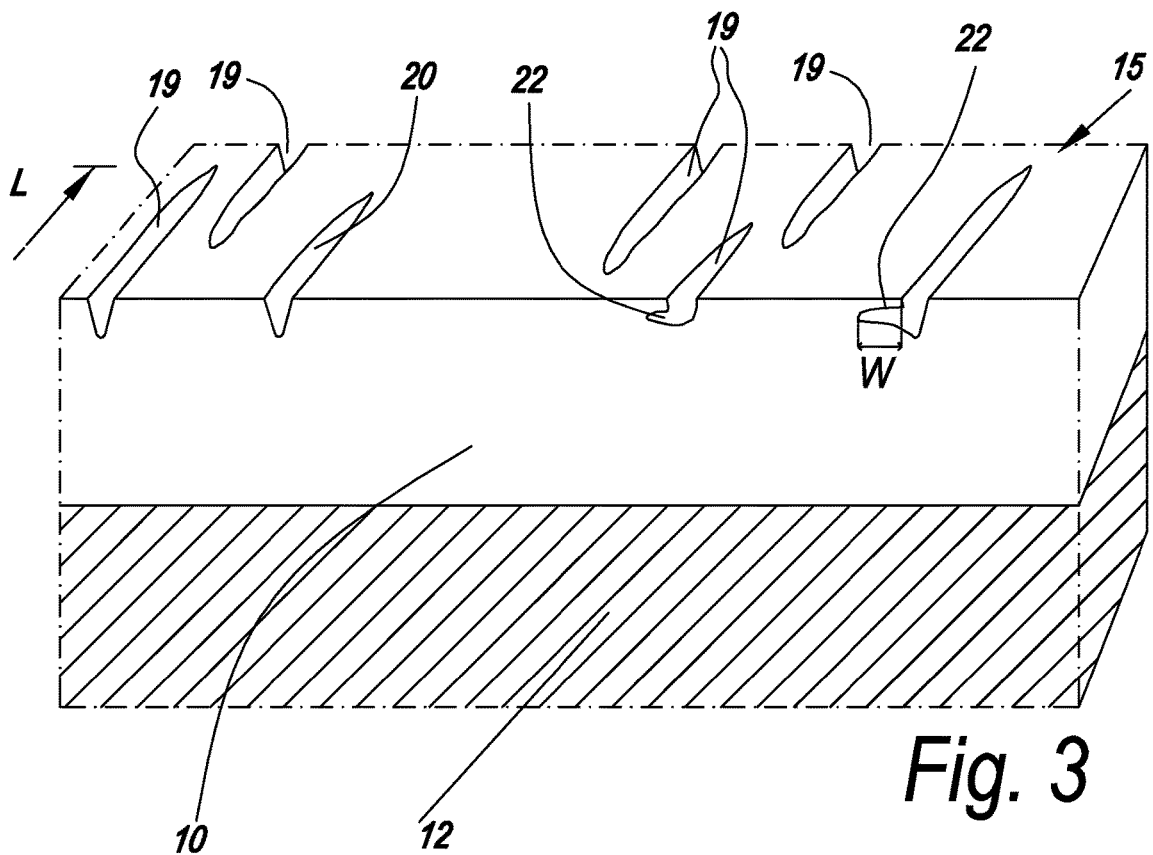
FIG. 3 in perspective, in cross-section and at a larger scale represents a view on the section indicated by F3 in FIG. 2.

The decorative panel 1 comprises a decorative surface 15 (shown in FIGS. 2 and 3, not shown in the other figures). The decorative surface comprises an embossed pattern, wherein the embossed pattern is provided in the mineral layer of the decorative panel. The decorative surface 15 of the decorative panel 1 imitates a wood panel, wherein the embossed structure imitates wood nerves and wood pores.

FIG. 3 in perspective, in cross-section and at a larger scale represents a view on the section indicated by F3 in FIG. 2. The decorative floor panel has a decorative surface 15. The decorative surface comprises an embossed pattern, which is provided in the mineral layer 10. In the example shown, the decorative panel comprises a multilayer structure, wherein the mineral layer 10 is bonded onto a carrier layer 12. However, the carrier layer is optional, the decorative panel can consist of the mineral layer. The embossed pattern comprises elongated recesses 19. At least some of the elongated recesses have a length that is larger than their width.

FIG. 3 represents that elongated recesses 19 are provided that, over the major part of their length L, have a cross-section which is provided with inclined lateral flanks 20, or at least with one inclined lateral flank 20. The embossed pattern shown in FIG. 3 comprises undercuts 22 on the surface of the panel, the undercuts 22 are provided in the mineral layer 10. The width of the undercut W can be more than 0.5 millimeter, more than 1 millimeter, or even more than 2 millimeter.

Decorative panels have been made using a magnesium oxide mineral layer as mineral layer. Such magnesium oxide mineral layers for use in the invention can e.g. be made using a slurry having the following formulation:

- 34.84 wt % technical grade magnesium oxide, with a particle size smaller than 50 micrometer,
- 29.89 wt % technical grade $MgCl_2 \cdot 6H_2O$,
- 18.51 wt % water,
- 2.45 wt % phosphoric acid 85%,
- 6.84 wt % calcium carbonate,
- 6.84 wt % wood dust,
- 0.63 wt % PVA-fibers.

The formulation of the example for the magnesium oxide mineral layer does not limit the invention; the formulation can be varied.

The recipe of the example comprises magnesium oxychloride as the inorganic binder. It is also possible to use magnesium oxysulphate inorganic binders for producing magnesium oxide mineral layers for use in the invention. A silicone mold has been provided comprising the negative of the embossed pattern of the surface of the decorative panel to be manufactured.

A wood panel has been used to manufacture the mold. The wood panel has been sanded and brushed. A release agent has been provided on the surface of the wood panel. A thin layer of elastomeric polymer (silicone has been used) was poured on the surface of the wood panel. After the silicone polymer had cured, the silicone polymer layer so formed has been removed from the surface of the wood and used as mold. The mold provided a negative of the textured surface of the wood panel, including of the nerves and even of the undercuts.

A release agent has been provided in the mold; and the slurry of the formulation of the example given has been cast in the mold. The mineral panel cast this way has been taken out of the mold after the slurry had dried and set. The mineral layer copied nicely the texture of the mold, in which even undercuts have been provided on the surface of the mineral panel cast with the magnesia oxide binder slurry.

In a similar way as magnesium oxide decorative panels, UHPC (Ultra High Performance Concrete) decorative panels can be made, using the same types of mold as used when manufacturing the magnesium oxide decorative panel. Such UHPC panels can be made using UHPC slurries known in the art. Such slurries can comprise additives such as for instance aluminum oxide, chopped glass fiber and pigments. The slurry can comprise plasticizers as well, e.g. superplasticizers such as polycarboxylates.

An example of a UHPC decorative panel has been made using the same mold as in the magnesium oxide decorative panel example. The formulation for the UHPC slurry to make the panel consisted of:
- 85 wt % commercially available UHPC cement premix;
- 2-10 wt % aluminum oxide;
- 2 wt % chopped glass fibers;
- 0.05-0.5 wt % pigment;
- 2 wt % liquid plasticizer; and
- 10 wt % water.

The slurry made with this composition was cast in the mold to make an UHPC panel. The UHPC-panel made was 12 millimeter thick. The UHPC panel showed excellent mechanical properties:
- flexural strength 7.7 MPa after one day, 12.0 MPa after 7 days and 16.4 MPa after 28 days.
- compressive strength 43.8 MPa after one day, 92.0 after 7 days and 122.5 MPa after 28 days.

Mineral layers for use in the invention—and especially magnesium oxide mineral layers—can be produced in an alternative way than via casting of a slurry in a textured mold. The slurry can be extruded or cast on a flat mold or on a carrier. The slurry can e.g. be cast on a carrier that will provide the carrier layer in the decorative panel to be made. A structured press plate can be used to provide the surface of the mineral layer with an embossed structure. This press operation can be performed before curing the mineral layer or after partial curing of the mineral layer. Such approach allows to make large boards from which the decorative panels are cut. Coupling parts can be milled in the decorative panels in the mineral layer, or if a carrier layer is provided, partly of fully in the carrier layer. It is preferred when the press operation with the structured press plate is performed before curing the mineral layer.

The example of a UHPC decorative panel—made using the same mold as in the magnesium oxide decorative panel example and therefore comprising an embossed pattern—has been provided with a staining pattern, in register with the embossed pattern. The staining pattern has been provided by means of spraying of a staining liquid comprises nanopigments in a binder onto the embossed UHPC-surface of the panel. The binder of the staining was an UV-curing acrylate. The staining in register with the natural wood embossed structure in the mineral layer simulated the color of a wood panel.

After application of the staining, three lacquer layers have been applied. First, a primer layer has been applied, followed by a sealer and finally by a top coat. Each of the three lacquer layers have been applied via roller coating (however, other methods of application can be used, e.g. spraying); and comprised aliphatic urethane monomer and oligomer acrylates. The coating layers comprised abrasion resistant particles, but did not comprise matting agents. The lacquer layers have been cured by means of UV-curing.

In the floor covering of FIG. 1, only the mineral layer of the decorative panels, with its embossments and with its optional staining and its optional lacquer layer(s) is visible in top view of the floor covering.

FIG. 4 shows a cross-section along line IV-IV shown in FIG. 2. The first pair of opposite edges 2, 3 of the decorative panel 1 is provided with mechanical coupling means 6 that are mainly realized as a tongue 7 and a groove 8 delimited by an upper lip 9 and a lower lip 33, wherein the tongue 7 and the groove 8 are mainly responsible for the locking in a vertical direction, and wherein the tongue 7 and the groove 8 are provided with additional locking elements 34, 35 which are mainly responsible for the locking in a horizontal direction. The locking elements comprise a projection 34 on the underside of the tongue 7 and a recess 35 in the lower groove lip 33. The coupling means 6 shown in FIG. 4 allow at least coupling by means of a rotating movement R (see FIG. 1) around the respective edges 2, 3 and/or coupling by means of a sliding movement in a substantially horizontal manner of the edges to be coupled 2, 3 to each other. The first pair of opposite edges 2, 3 is provided with bevels 25.

FIG. 5 shows decorative panels according to FIGS. 2, 3 and 4 coupled at their first pair of opposite edges 2, 3.

In the examples shown in FIGS. 4 and 5, the coupling parts are provided in the carrier layer. This can be realized by milling operations after production of the decorative panel.

FIGS. 4 and 5 show that the mineral layer 10 of these exemplary decorative panels comprise at the first edge of the first pair of parallel opposite edges a first contact surface 26 and at the second edge of the first pair of parallel opposite edges a second contact surface 27.

In coupled condition of two such panels, a first such panel and a second such panel, at the first pair of parallel opposite edges, the first contact surface 26 of a first panel contacts the second contact surface 27 of the second panel.

The first contact surface 26 and the second contact surface 27 are perpendicular to the surface of the decorative panel. The surface of the coupling parts can optionally at least partly be provided with a sealing agent.

The coupling parts of the decorative panel shown in FIGS. 4 and 5 are provided in the carrier layer 12 which is bonded to the mineral layer 10. It is however also possible to provide the coupling parts partially or completely in the mineral layer 10. When the decorative panel does not comprise a carrier layer, the coupling parts are completely provided in the mineral layer.

FIGS. 6-11 show alternative ways of coupling decorative panels according to the invention. The embossed structure in the mineral layer is not shown in FIGS. 6-11.

Figure 6:
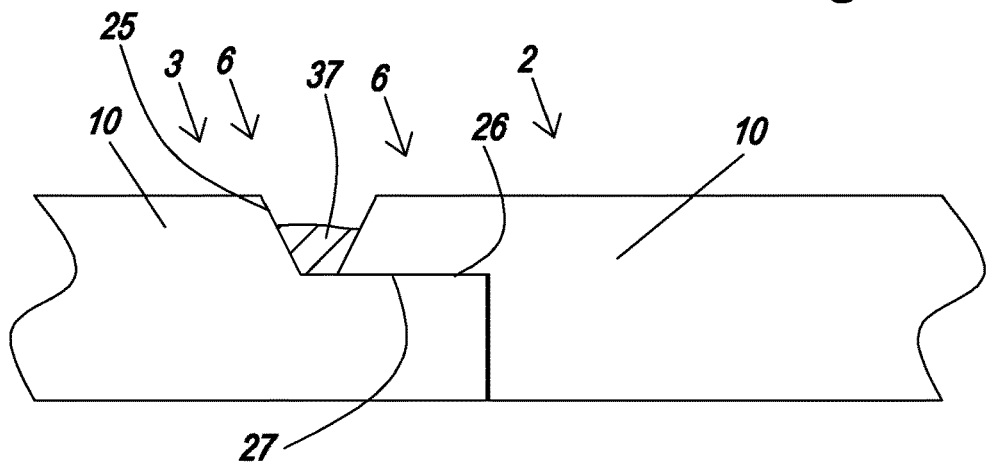
FIGS. 6-11 show alternative ways of coupling decorative panels according to the invention.

In the example of FIG. 6, the decorative panels do not comprise a carrier layer, and only have the mineral layer 10, with its embossments and optional staining and lacquer layers. The decorative panels comprise at their first pair of opposite edges 2, 3 coupling means 6. The coupling means comprise a first contact surface 26 and a second contact surface 27. The contact surfaces 26, 27 are horizontal (and thus parallel with the surface of the decorative panels) and overlap in coupled condition of two such panels at their first pair of opposite edges 2, 3. This way, an overlap of the mineral layers 10 of both panels is created. The first pair of opposite edges is optionally provided with bevels 25 in the mineral layer 10. Optionally, grout 37 can be provided at the coupled panel edges. The grout 37 can provide an improved coupling, provide improved water tightness, and provide a realistic simulation of a natural stone tile covering. The contact surfaces 26, 27 can optionally be provided with a sealing agent. It is possible, however not necessarily required, that the panels shown in FIG. 6 are bonded to a supporting layer (e.g. to the floor when the decorative panels are floor panels) by means of an adhesive, e.g. by means of mortar.

Figure 7:
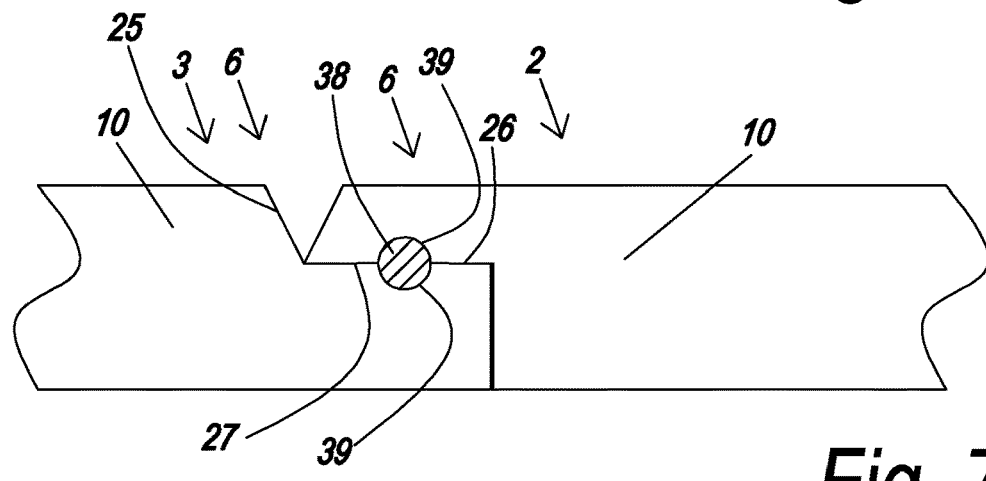

The configuration of FIG. 7 is to a large extent similar to the configuration of FIG. 6. Reference numbers have the same meaning as in FIG. 6. The difference is that recesses 39 are provided in one or in both (as shown in FIG. 7) panel edges 2, 3. An adhesive 38 can be applied in one or both recesses when installing the panels. The adhesive provides a bonding of the decorative panels to each other. Such approach can be used for installing decorative panels that simulate wood panels. It is a benefit that the adhesive is not visible after installation of the decorative panels.

Figure 8:
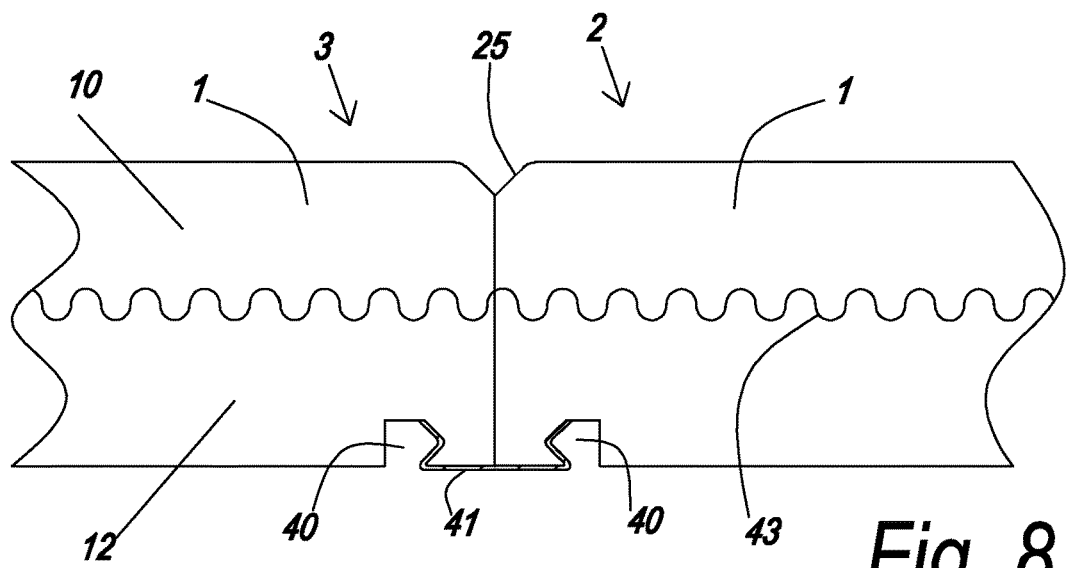

FIG. 8 shows yet an alternative way of coupling the decorative panels according to the invention. The decorative panels 1 comprise a first pair or parallel opposite edges 2, 3. Both edges of the first pair of parallel opposite edges 2, 3 are each provided with a recess 40—provided at the bottom of the decorative panel—for fitting an insert 41. The insert 41 presses the first such panel towards the second such panel by means of an elastic bending force of the insert 41. During installation of the decorative panels, the insert 41, an elongated profile, can be put on the floor and the decorative panels—with their recess 40—can be slid over the insert 41. The decorative panel of FIG. 8 comprises a mineral layer 10 and a carrier layer 12, however, this method of coupling can also be used when the decorative panel does not comprise a carrier layer. In the example shown in FIG. 8, the carrier layer 12 is provided with a structured surface 43 at the interface with the mineral layer 10. The decorative panel of FIG. 8 is provided at edges with a bevel 25.

Figure 9:
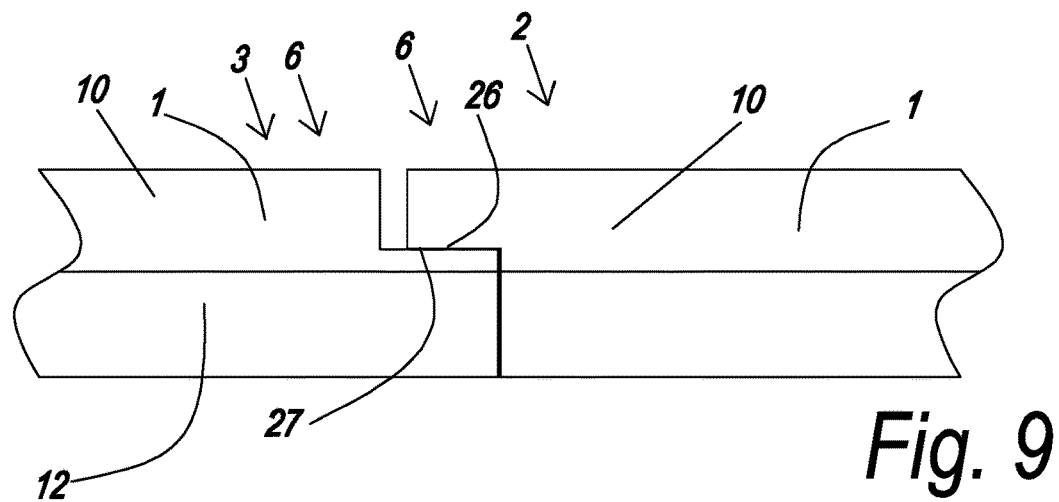

FIG. 9 shows a variant to the embodiment of FIG. 6. Reference numerals in FIG. 9 have the same meaning as in FIG. 6. The embodiment of FIG. 9 differs from the embodiment from FIG. 6 in that the decorative panels 1 comprise a mineral layer 10 adhered to a carrier layer 12. The coupling parts are entirely provided in the mineral layer 10. It is also possible to provide the coupling parts entirely in the carrier layer 12. The panel edges of the example of FIG. 9 are not provided with bevels, however, it is also possible to provide the panels with bevels.

Figure 10:
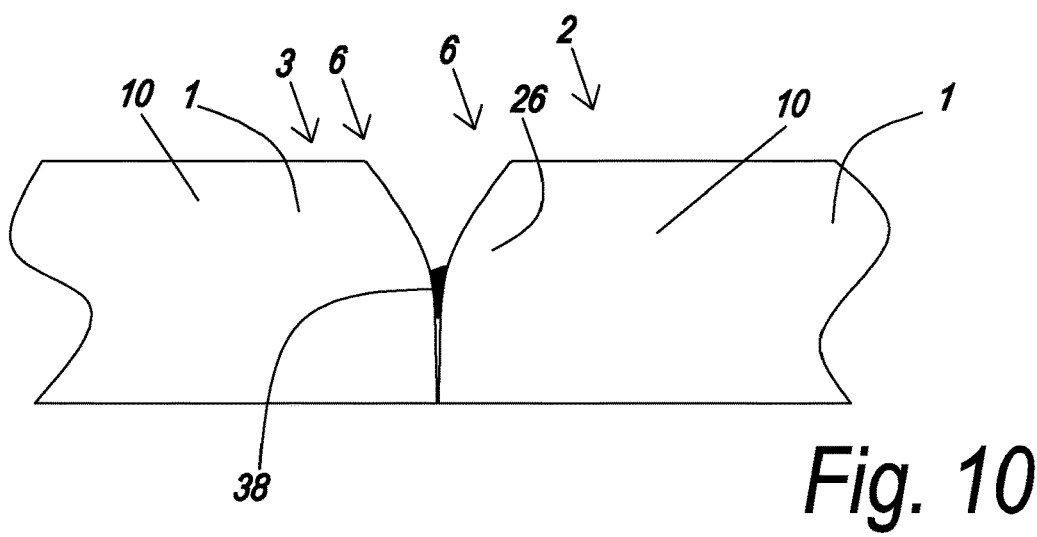

FIG. 10 shows another embodiment. The reference numerals have the same meaning as in the other figures. An adhesive 38 is provided between the edges 2, 3 of the coupled panels. The edges 2, 3 are shaped such that when the floor covering comprising such coupling are viewed from above, the adhesive is barely visible because it is provided in the shadow area of the edges. The adhesive 38 provides for a bonding between the decorative panels; and provides water tightness of the joint between the panels. The second pair of opposite edges of rectangular—square or oblong—decorative panels, can be coupled in the same way. FIG. 10 shows an embodiment without carrier layer, however, the decorative layer can comprise a carrier layer onto which the mineral layer 10 is adhered.

Figure 11:
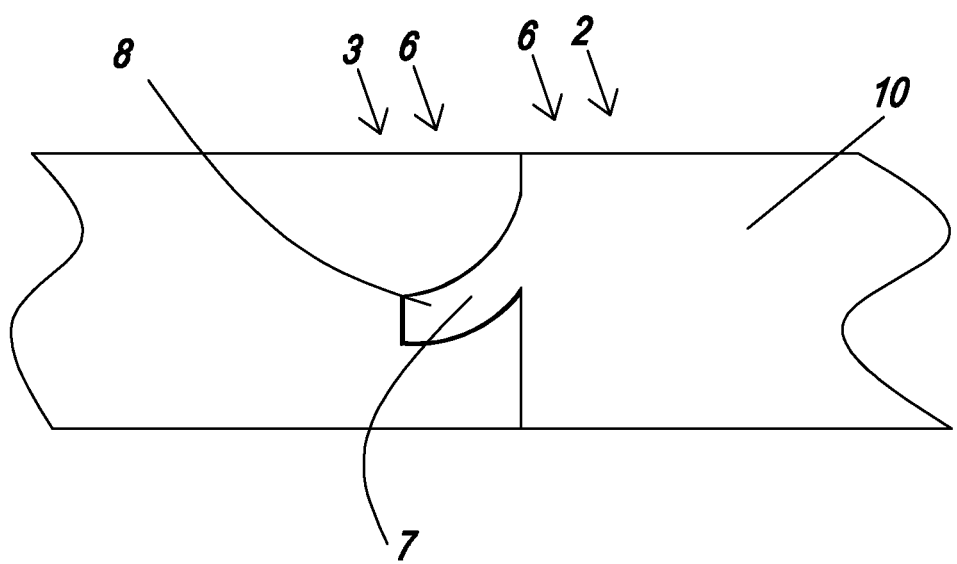

FIG. 11 shows another embodiment. Reference numerals have the same meaning as in the other figures. The edges comprise coupling parts 6. The coupling is a tongue 7 and groove 8 coupling that can be realized by a turning movement of the edge 2 into the edge 3, wherein a locking is established in the direction perpendicular to the surface of the panels as well as in the plane parallel with the surface of the panels and perpendicular to the coupled edges.

Some of the examples presented in the figures relate to a decorative panel wherein the mineral layer is bonded onto a carrier layer. Different types of carrier layers are possible, and the carrier layer can be provided in several ways. Of particular interest is a carrier layer that allows to mill coupling parts in the carrier layer, for coupling the decorative panels at their edges. Of particular interest is the use of a cement fiber board as carrier layer.

The mineral layer can be bonded to the carrier layer by means of an adhesive or by means of cementitious or inorganic binders present in the mineral layer. The carrier layer can be a second mineral layer, having a different composition than the mineral layer.

The carrier layer can have a lower density than the mineral layer, to provide a lighter decorative panel. To this end, e.g. a HDF-panel can be provided as carrier layer.

Although most examples show a decorative panel that comprises a multilayer, more particularly a mineral layer on a carrier layer, the invention is not limited to such multilayers. The invention also relates to decorative panels in which the mineral layer is not provided on a carrier layer.

The invention claimed is:

1. A decorative panel comprising a mineral layer;
wherein the decorative panel comprises a decorative surface,
wherein the decorative surface comprises an embossed pattern,
wherein the embossed pattern is provided in the mineral layer;
wherein the mineral layer comprises pigments, wherein the pigments color the mineral layer throughout an entire volume of the mineral layer;
wherein the mineral layer is provided with a staining pattern of a stain;
wherein the staining pattern is provided in register with the embossed pattern.

2. The decorative panel as in claim 1, wherein the embossed pattern comprises undercuts in the surface of the panel.

3. The decorative panel as in claim 1, wherein the mineral layer is provided with a sealing agent before or after, or before and after application of the staining pattern.

4. The decorative panel as in claim 1, wherein the decorative surface of the decorative panel comprises one or a plurality of lacquer layers.

5. The decorative panel as in claim 1, wherein the mineral layer is selected from a concrete layer, a magnesium oxide layer, or a gypsum layer.

6. The decorative panel as in claim 1, wherein the mineral layer is a concrete layer comprising ultra, high-performance concrete.

7. The decorative panel as in claim 1, wherein the decorative panel comprises a first pair of parallel opposite edges,
wherein the first pair of parallel opposite edges comprises coupling parts, which allow that two of such floor panels mutually can be coupled to each other at the parallel opposite edges;
optionally the surface of the coupling parts is at least partly provided with a sealing agent;
optionally the coupling parts comprise locking elements which prevent drifting apart of two coupled panels into the direction perpendicular to the surface of the coupled panels and/or into a direction perpendicular to respective coupled edges in a plane of the coupled panels.

8. The decorative panel as in claim 1, wherein the staining pattern comprises a wood pattern or a stone pattern.

9. The decorative panel as in claim 1, wherein the embossed pattern in the mineral layer comprises at least a first region and a second region, said first region having a higher porosity than the second region.

10. The decorative panel as in claim 9, wherein the staining pattern includes more stain in the first region than the second region.

11. A method to produce a decorative panel, wherein a mold is provided comprising a negative of an embossed pattern of a surface of the decorative panel to be manufactured,
optionally spraying a release agent in the mold, pouring a slurry comprising an inorganic binder in the mold to create a mineral layer for the decorative panel, wherein the surface of the mineral layer is to comprise the embossed pattern, demolding a cast panel after the slurry has dried and set;

wherein the mineral layer comprises pigments, wherein the pigments color the mineral layer throughout an entire volume of the mineral layer;

wherein a staining pattern is applied onto the embossed surface of the mineral layer;

wherein the staining pattern is provided in register with the embossed pattern.

12. The method an in claim 11, wherein after pouring the slurry into the mold, a carrier layer is applied onto the slurry, in order to provide the mineral layer on a carrier layer in the decorative panel.

13. The method as in claim 11, wherein the embossed pattern provided on the surface of the mineral layer comprises undercuts.

14. The method as in claim 11, wherein the inorganic binder in the slurry comprises anyone of or a combination of one or more selected from Portland cement, Sorel cement, magnesium oxychloride cement, magnesium oxysulphate cement, gypsum or a geopolymer cement binder.

15. The method as in claim 11, wherein the staining pattern is applied by a roller coater or by spraying, or by digital inkjet printing.

16. A method to produce a decorative panel, wherein a slurry comprising an inorganic binder is extruded or cast on a flat mold or on a flat carrier to produce a mineral layer for the decorative panel, and wherein in a subsequent process step the mineral layer is embossed by a structured press plate or by an embossing cylinder;

wherein a staining pattern is applied onto an embossed surface of the mineral layer;

wherein the mineral layer comprises pigments, wherein the pigments color the mineral layer throughout an entire volume of the mineral layer;

wherein the staining pattern is provided in register with the embossed pattern.

17. The method as in claim 16, wherein the slurry is extruded on a carrier wherein the carrier will form a carrier layer for the mineral layer of the decorative panel.

18. The method as in claim 16, wherein the inorganic binder in the slurry comprises anyone of or a combination of one or more selected from Portland cement, Sorel cement, magnesium oxychloride cement, magnesium oxysulphate cement, gypsum or a geopolymer cement binder.

19. The method as in claim 16, wherein the staining pattern is applied by a roller coater or by spraying, or by digital inkjet printing.

* * * * *